US011926539B2

(12) United States Patent
Bush et al.

(10) Patent No.: US 11,926,539 B2
(45) Date of Patent: Mar. 12, 2024

(54) SYSTEMS AND METHODS FOR DESALINATION OF LIQUIDS

(71) Applicant: ACQUOLINA IL MONDO, LLC, Fort Worth, TX (US)

(72) Inventors: Garry Bush, Edmonton (CA); Robert Keetch, Austin, TX (US)

(73) Assignee: ACQUOLINA IL MONDO LLC, Fort Worth, TX (US)

( * ) Notice: Subject to any disclaimer, the term of this patent is extended or adjusted under 35 U.S.C. 154(b) by 0 days.

(21) Appl. No.: 18/033,552

(22) PCT Filed: Oct. 25, 2020

(86) PCT No.: PCT/CA2020/051431
§ 371 (c)(1),
(2) Date: Apr. 24, 2023

(87) PCT Pub. No.: WO2022/082292
PCT Pub. Date: Apr. 28, 2022

(65) Prior Publication Data
US 2023/0391649 A1    Dec. 7, 2023

(51) Int. Cl.
*C02F 1/26* (2023.01)
*C02F 1/20* (2023.01)
(Continued)

(52) U.S. Cl.
CPC ............... *C02F 1/265* (2013.01); *C02F 1/20* (2013.01); *C02F 9/00* (2013.01); *C02F 1/001* (2013.01);
(Continued)

(58) Field of Classification Search
None
See application file for complete search history.

(56) References Cited

U.S. PATENT DOCUMENTS

| 6,623,603 B1 | 9/2003 | Call et al. |
| 8,529,155 B2 | 9/2013 | DiTommaso et al. |

(Continued)

FOREIGN PATENT DOCUMENTS

| CA | 2847882 | 3/2013 |
| CA | 2822927 | 2/2015 |

(Continued)

OTHER PUBLICATIONS

International Search Report dated Jun. 28, 2022 of PCT Application PCT/CA2020/051431 (the subject application is in the same family as PCT/CA2020/051431, published as WO 2022/082292).

*Primary Examiner* — Peter Keyworth
(74) *Attorney, Agent, or Firm* — Knobbe, Martens, Olson & Bear, LLP

(57) ABSTRACT

According to some embodiments, a system for desalination of a liquid comprises at least one primary treatment process, at least one secondary treatment process, wherein the at least one secondary treatment process comprises at least one reactor, and at least one tertiary treatment process, wherein the at least one primary treatment process is configured to adjust a pH of the liquid to target pH level and to add at least one chemical additive to the liquid, wherein the at least one reactor is configured to heat the liquid to a temperature of at least 350° F. and to supply a pressure to the liquid to maintain the liquid in a liquid state, and wherein the dissolved salt of the liquid is configured to react with at least a portion of the at least one chemical additive to form an insoluble product within the at least one reactor.

14 Claims, 7 Drawing Sheets

(51) Int. Cl.
  *C02F 9/00* (2023.01)
  *C02F 1/00* (2023.01)
  *C02F 1/02* (2023.01)
  *C02F 1/32* (2023.01)
  *C02F 1/52* (2023.01)
  *C02F 1/66* (2023.01)
  *C02F 5/06* (2023.01)
  *C02F 103/08* (2006.01)

(52) U.S. Cl.
  CPC .......... *C02F 2001/007* (2013.01); *C02F 1/02* (2013.01); *C02F 1/32* (2013.01); *C02F 1/5236* (2013.01); *C02F 1/66* (2013.01); *C02F 5/06* (2013.01); *C02F 2103/08* (2013.01); *C02F 2201/004* (2013.01); *C02F 2201/48* (2013.01); *C02F 2209/02* (2013.01); *C02F 2209/03* (2013.01); *C02F 2209/05* (2013.01); *C02F 2303/04* (2013.01); *C02F 2303/18* (2013.01)

(56) References Cited

U.S. PATENT DOCUMENTS

| | | | |
|---|---|---|---|
| 9,067,807 | B2 | 6/2015 | Soane et al. |
| 9,902,652 | B2 | 2/2018 | Devenney et al. |
| 11,827,536 | B2 | 11/2023 | Bush et al. |
| 2011/0108491 | A1 | 5/2011 | Lean et al. |
| 2014/0263081 | A1* | 9/2014 | Thiers .................. C02F 1/5245 |
| | | | 210/175 |
| 2015/0329378 | A1 | 11/2015 | Polk |
| 2021/0278080 | A1 | 9/2021 | Kraczek |
| 2021/0395111 | A1 | 12/2021 | Polk |
| 2023/0331588 | A1 | 10/2023 | Bush et al. |

FOREIGN PATENT DOCUMENTS

| | | |
|---|---|---|
| CA | 2968397 | 11/2018 |
| CA | 3041489 | 10/2020 |
| WO | WO 2022/082292 | 4/2022 |

* cited by examiner

SYSTEMS AND METHODS FOR DESALINATION OF LIQUIDS

CROSS REFERENCE TO RELATED APPLICATIONS

This application is the United States National Stage under 37 U.S.C. § 371 of PCT/CA2020/051431 filed on Oct. 25, 2020, which is incorporated by reference in its entirety herein.

BACKGROUND

Field

This application relates generally to systems and methods for desalination of fluids. More particularly, it relates to systems and methods for the desalination of water.

Description of the Related Art

Fresh, clean water has a number of different uses, not the least of which is human consumption. The ability to remove salts, impurities and other contaminants from water allows water to be used or reused for many different purposes. Contaminated water sources, fluid from fracking operations and salt water could all be decontaminated and the salt removed to allow it to be used for other purposes. Increasing the availability of clean, fresh water could be beneficial.

SUMMARY

According to some embodiments, a system for desalination of a liquid having a dissolved salt, the system comprises at least one primary treatment process, at least one secondary treatment process, wherein the at least one secondary treatment process comprises at least one reactor, and at least one tertiary treatment process, wherein the at least one primary treatment process is configured to adjust a pH of the liquid to target pH level and to add at least one chemical additive to the liquid, wherein the at least one reactor is configured to heat the liquid to a temperature of at least 350° F. and to supply a pressure to the liquid to maintain the liquid in a liquid state, wherein the dissolved salt of the liquid is configured to react with at least a portion of the at least one chemical additive to form an insoluble product within the at least one reactor, wherein heat is produced when the insoluble product is formed within that at least one reactor, and wherein at least a portion of the insoluble product formed within the at least one reactor is configured to be removed from the liquid during the at least one tertiary treatment process.

According to some embodiments, the target pH level is 10 or greater (e.g., 10, 10.5, etc.). In some embodiments, the at least one chemical additive comprises a phosphate salt (e.g., trisodium phosphate). In one embodiment, the insoluble product comprises a cation of dissolved salt and phosphate. In some arrangements, the at least one tertiary treatment process configured to remove the insoluble product from the liquid comprises a filter.

According to some embodiments, the at least one tertiary treatment process configured to remove the insoluble product from the liquid comprises a filter (e.g., multi-media filter). In some embodiments, the at least one tertiary treatment process configured to remove the insoluble product from the liquid comprises at least one settling tank or at least one polishing tank.

According to some embodiments, the system does not include reverse osmosis or any other membrane technology.

According to some embodiments, the at least one primary treatment process comprises lime softening to remove at least a portion of hardness of the liquid before the liquid enters the at least one reactor. In some embodiments, the at least one primary treatment process further comprises removing at least one of sand, silt, grit and gases.

According to some embodiments, the system further comprises at least one heat exchange unit, the at least one heat exchange unit being configured to transfer heat from the liquid at one location of the system to the liquid at a different location of the system.

According to some embodiments, heat produced or otherwise generated when the insoluble product is formed within that at least one reactor is configured to permit the system to operate without an external introduction of heat to the liquid.

According to some embodiments, the system further comprises an external heating system configured to transfer heat to the liquid within the at least one reactor. In some embodiments, the external heating system comprises an oil heating system. In some embodiments, an oil circulated through the oil heating system comprises a plant-based oil.

According to some embodiments, the system further comprises at least one turbine configured to be moved when liquid is moved through at least one portion of the system, the at least one turbine being configured to generate at least some energy.

According to some embodiments, the primary treatment process further comprises at least one mixing tank, wherein the at least one mixing tank is configured to facilitate mixing of the at least one chemical additive in the liquid.

According to some embodiments, the system further comprises at least one quaternary treatment process. In some embodiments, the at least one quaternary treatment process comprises disinfection (e.g., UV disinfection or chlorination).

According to some embodiments, the system is configured to treat at least one of the following: sea water, well water, brackish water, water generated in hydraulic fracturing procedures and wastewater.

According to some embodiments, the at least one reactor is configured to heat the liquid to a temperature of at least 400° F., 450° F., 500° F., 550° F., etc.).

According to some embodiments, a method for desalination of a liquid having a dissolved salt comprises treating the liquid using at least one primary treatment process, treating the liquid using at least one secondary treatment process, wherein the at least one secondary treatment process comprises at least one reactor, and treating the liquid using at least one tertiary treatment process, wherein the at least one primary treatment process is configured to adjust a pH of the liquid to target pH level and to add at least one chemical additive to the liquid, wherein the at least one reactor is configured to heat the liquid to a temperature of at least 350° F. and to supply a pressure to the liquid to maintain the liquid in a liquid state, wherein the dissolved salt of the liquid is configured to react with at least a portion of the at least one chemical additive to form an insoluble product within the at least one reactor, wherein heat is produced when the insoluble product is formed within that at least one reactor, and wherein at least a portion of the insoluble product formed within the at least one reactor is configured to be removed from the liquid during the at least one tertiary treatment process.

According to some embodiments, the target pH level is 10 or greater (e.g., 10, 10.5, etc.). In some embodiments, the at least one chemical additive comprises a phosphate salt (e.g., trisodium phosphate). In one embodiment, the insoluble product comprises a cation of dissolved salt and phosphate. In some arrangements, the at least one tertiary treatment process configured to remove the insoluble product from the liquid comprises a filter.

According to some embodiments, the at least one tertiary treatment process configured to remove the insoluble product from the liquid comprises a filter (e.g., multi-media filter). In some embodiments, the at least one tertiary treatment process configured to remove the insoluble product from the liquid comprises at least one settling tank or at least one polishing tank.

According to some embodiments, the system does not include reverse osmosis or any other membrane technology.

According to some embodiments, the at least one primary treatment process comprises lime softening to remove at least a portion of hardness of the liquid before the liquid enters the at least one reactor. In some embodiments, the at least one primary treatment process further comprises removing at least one of sand, silt, grit and gases.

According to some embodiments, a system for desalination of a fluid to be desalinated from a fluid source includes a first filtering vessel with a first filtering fluid inlet, a first filtering fluid outlet and a first filtering drain is used to remove large particles from the fluid to be desalinated. The first filtering fluid inlet is in fluid communication with the fluid source. A degassing vessel is provided with a degassing fluid inlet being in fluid communication with the first filtering fluid outlet. The degassing vessel has a degassing fluid outlet and a gas release. The degassing vessel removes at least a portion of gases suspended within the fluid to be desalinated. A heating vessel is provided that has a hollow interior. The hollow interior is filled with a first fluid. The heating vessel has a transfer tube that is positioned within and traversing the hollow interior. The transfer tube has a heating vessel inlet and a heating vessel outlet. The heating vessel inlet is provided in fluid communication with the degassing fluid outlet. The heating vessel is heated by a heater and the heating vessel outlet has a one-way valve. A second filtering vessel is provided that has at least one filter, a second filtering inlet, a second filtering outlet and a second drain. The second filtering inlet is in fluid communication with the heating vessel outlet. A holding tank has a desalinated fluid inlet that is in fluid communication with the second filtering outlet. The holding tank stores the fluid after it has been desalinated. A pump is used for pumping fluid to be desalinated through the system.

According to some embodiments, a mixing tank is provided. The mixing tank has a mixing tank inlet, a mixing tank outlet, a chemical inlet and a mixing mechanism. The mixing tank is positioned between the degassing vessel and the heating vessel such that the mixing tank outlet is in fluid communication with the degassing fluid outlet and the mixing tank inlet is in fluid communication with the heating vessel inlet.

According to some embodiments, the transfer tube comprises an alloy metal. The alloy metal does not attract or allow the salt in the fluid to be desalinated to stick to the transfer tube.

According to some embodiments, the first fluid comprises an oil. The oil may be a mineral oil, a sunflower oil, a vegetable oil, an olive oil or any other suitable oil known to a person skilled in the art.

According to some embodiments, the one-way valve is opened at a predetermined temperature. This ensures that the fluid to be desalinated is heated to a specific temperature before exiting the heating vessel. In one embodiment, the predetermined temperature is 400 to 500° F. (e.g., 450° F.).

According to some embodiments, the heater comprises an electric heater. The heater may be positioned within the hollow interior of the heating vessel or may heat the first fluid from the exterior of the heating vessel.

According to some embodiments, the heating vessel includes an interior pressure of 500 to 600 psi (e.g., 550 psi). This can help keep solids suspended in the fluid to be desalinated so that they do not settle while the fluid to be desalinated travels through transfer tube.

According to some embodiments, a heat exchanger is provided for pre-heating the fluid to be desalinated prior to entering the heating vessel and cooling the fluid to be desalinated after it has been passed through the heating vessel. In this embodiment, heating vessel and heat exchanger work in cooperation to heat the fluid to be desalinated and improve the efficiency of the system.

According to some embodiments, a settling tank is positioned between the second filtering vessel and the holding tank to collect material that settles out of the fluid to be desalinated. The settling tank has a settling tank inlet, a settling tank outlet and a settling tank drain. The settling tank inlet is provided in fluid communication with the second filtering outlet and the settling tank outlet is provided in fluid communication with the desalinated fluid inlet.

According to some embodiments, a polishing tank is positioned between the settling tank and the holding tank. The polishing vessel has a polishing vessel inlet and a polishing vessel outlet and contains a plurality of resin beads. The resin beads help to remove small molecules from the fluid. The polishing vessel inlet is in fluid communication with the settling tank outlet and the polishing vessel outlet is provided in fluid communication with the desalinated fluid inlet.

According to some embodiments, a method of desalinating a fluid is disclosed. A fluid to be desalinated is provided and at least a portion of the suspended solids is filtered out. At least a portion of the gasses within the fluid are removed before fluid treatment chemicals are mixed into the fluid to be desalinated. The fluid to be desalinated is transported through a heating vessel that has a hollow interior with a transfer tube that is positioned within the hollow interior and traverses the hollow interior. The transfer tube has a heating vessel inlet and a heating vessel outlet. The heating vessel is heated by a heater. The hollow interior is filled with a first fluid and the transfer tube transports the fluid to be desalinated through the heating vessel. After passing through the heating vessel, the fluid to be desalinated is filtered to remove molecules larger than 3 microns. The fluid is then allowed to settle in a settling tank to precipitate out molecules to create a desalinated fluid. The desalinated fluid is collected in a holding tank.

According to some embodiments, the fluid treatment chemicals comprises a phosphate. The phosphate can include trisodium phosphate.

According to some embodiments, the fluid treatment chemicals comprises a dispersant. The dispersant may be an iron oxide dispersant such as Acumer 3100™ sold by Dow Chemicals.

According to some embodiments, a further step of adding aluminum sulfate to the settling tank is completed. The addition of aluminum sulfate causes phosphate molecules to precipitate out of solution.

According to some embodiments, a step of polishing the fluid in a vessel with resin beads is completed prior to collecting the desalinated fluid in a holding tank. The vessel with resin beads helps to collect fine molecules and sodium that remain after the fluid has passed through the settling tank.

According to some embodiments, the desalinated fluid is treated with UV to kill bacteria.

BRIEF DESCRIPTION OF THE DRAWINGS

These and other features, aspects and advantages of the present application are described with reference to drawings of certain embodiments, which are intended to illustrate, but not to limit, the present inventions. It is to be understood that these drawings are for the purpose of illustrating the various concepts disclosed herein and may not be to scale.

DETAILED DESCRIPTION

Although various embodiments of a fluid treatment system and methods disclosed herein have specific relevance to desalination, the features, advantages and other characteristics disclosed herein may have direct or indirect applicability in other applications, such as, for example, the removal of various salts, other dissolved materials, other contaminants or materials from a fluid and/or the like.

Several embodiments of the inventions disclosed herein are particularly advantageous because they include one, several or all of the following benefits: (i) provide an enhanced system for removing salts and other contaminants from water or other liquid; (ii) provide a self-sustaining system from the perspective of external energy input; (iii) provide a desalination system with a reduced carbon footprint and/or additional environmental benefits; (iv) provide a treatment system for the removal of salts from a water source without the need for reverse osmosis or other membrane technologies; and (v) provide a desalination system that generated heat that can be advantageously utilized in various treatment steps and processes.

Figure 1:
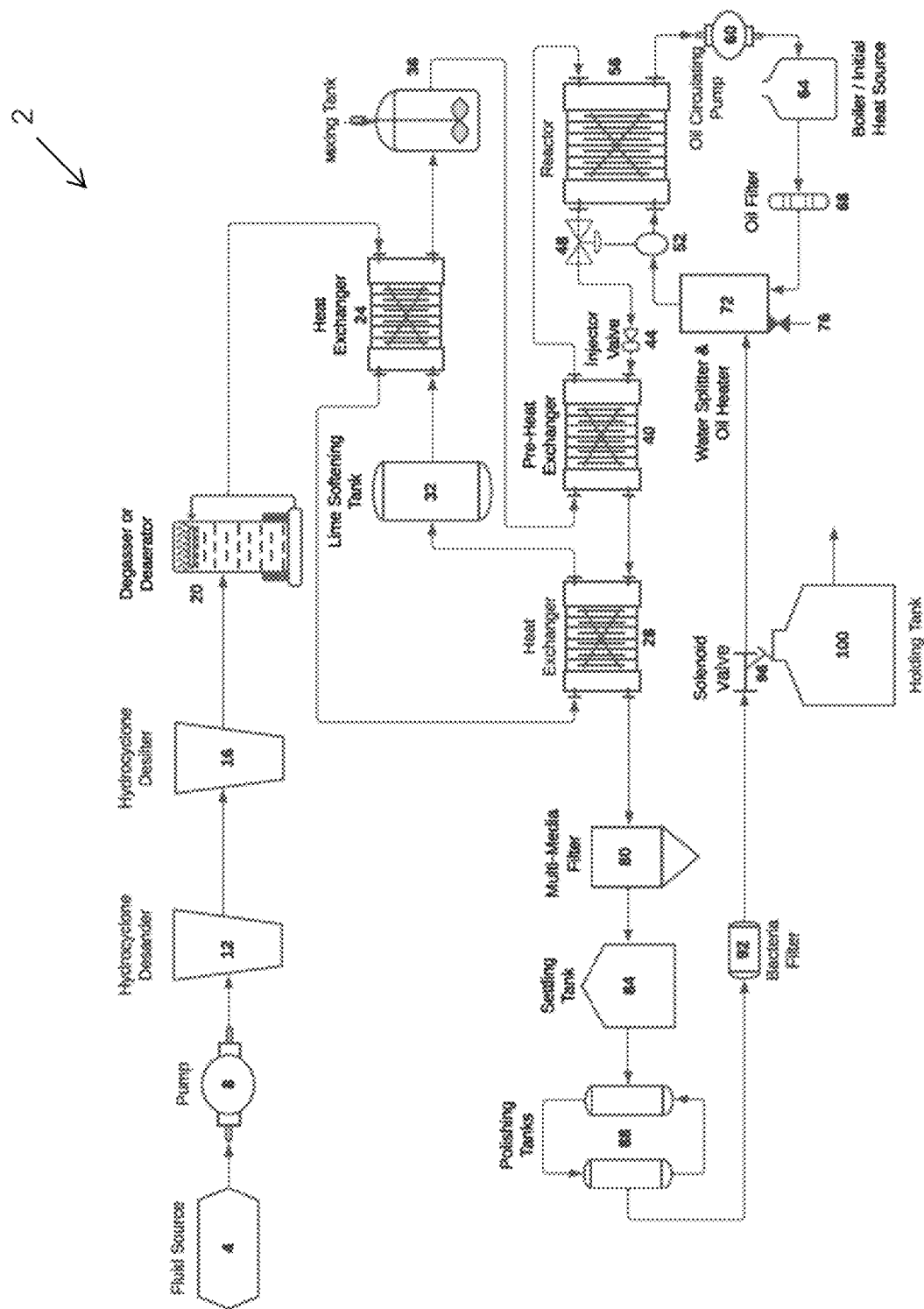
FIG. 1 schematically illustrates a process diagram of one embodiment of a water or other fluid treatment system.

FIG. 1 schematically illustrates a process diagram of one embodiment of a water or other fluid treatment system 2. As noted herein, the depicted system 2 can be used to remove salts and/or other substances from a water or other liquid stream. For example, the system 2 can be used to desalinate and/or otherwise treat one or more of the following: sea water, well water, brackish water, water generated and/or used in hydraulic fracturing procedures (e.g., frac water), wastewater (e.g., domestic, industrial, etc.) and/or any other effluent, liquid stream and/or liquid source containing a relatively high concentration of one or more salts.

In some embodiments, the system 2 is configured to treat a liquid stream that comprises up to 300,000 ppm (e.g., up to 300,000, up to 250,000, up to 200, 000, up to 150,000, up to 100,000, up to 50,000 ppm, values and ranges between the foregoing concentrations, etc.) of one or more salts. The system 2 can be adapted to remove one or more of the following salts: sodium chloride, magnesium hydroxide, calcium chloride, calcium carbonate, sodium sulfate, gypsum, etc.

The treatment method summarized in FIG. 1 includes several steps and processes that facilitate with various aspects related to treatment of water or other liquid. Such steps and processes can be advantageously customized based on one more considerations, including, for example, the type of water or other liquid being treated, the salt concentration of the water or other liquid being treated, other contaminants and substances of the water or other liquid being treated, other properties of the water or other liquid being treated (e.g., pH, temperature, alkalinity, etc.), the target level of treatment that is required or desired, the capacity of the system, the location of the system, ambient conditions where the system is located and/or the like.

Accordingly, the system 2 can be modified to remove and/or replace one or more of the treatment steps or processes in order to customize the design and improve the overall performance associated with treatment. Alternative designs for a treatment system are provided herein. However, it should be understood that additional system designs and embodiments not specifically disclosed in this application can be used that will share at least some of the inventive concepts provided by the treatment systems disclosed in FIG. 1 and elsewhere in this application.

With reference to FIG. 1, the treatment system 2 (and corresponding treatment method) can include a pump 8 that is configured to transfer water or other liquid from a fluid source 4 to the treatment scheme. As noted above, the fluid source 4 can include any one of various fluid sources, including, but not limited to, sea water, well water, brackish water, frac water, wastewater (e.g., domestic, industrial, etc.) and/or any other effluent, liquid stream and/or liquid source containing a relatively high concentration of one or more salts.

In some embodiments, the inlet pump 8 can include a single pump or a plurality of pumps, depending, at least in part, on the capacity of the treatment system, the location of the treatment system and its components relative to the fluid source 4 and/or other considerations or factors. The pump can be a self-priming pump that is designed and otherwise arranged to create a suction or siphoning effect from the fluid source. In other embodiments, the water or other liquid being treated can be configured to gravity flow from the fluid source to one or more of the treatment steps or processes of the system 2. The fluid source 4 can include a tank, vessel and/or other container. In other embodiments, however, the fluid source 4 can comprise a lake, the sea or other water body, a pipe and/or the like.

Next, the water or other liquid being treated can undergo some level of primary or preliminary treatment. In some arrangements, such primary or preliminary treatment can help remove larger materials and substances from the water or other liquid being treated, such as, for instance, larger materials (e.g., sand, silt, grit, textiles, grease, other residue, larger items, etc.). Removal of such items and substances during one or more primary treatment steps, stages or processes can provide one or more advantages or benefits, such as, e.g., improving the efficiency and effectiveness of the desalination/treatment system, protect equipment, devices and/or systems (e.g., against damage, wear and tear, etc.) and/or the like.

With respect to FIG. 1, the fluid source can be directed to treatment steps or processes that help remove sand, silt and/or grit. In the depicted embodiment, the system 2 comprises a hydrocyclone desander 12, a hydrocyclone desilter 16 and a degasser/deaerator 20. Such systems or components can be adapted to handle a continuous flow of the fluid source through them. In alternative arrangements, such systems or components can be adapted to be operated as batch systems.

In some arrangements, primary or preliminary treatment of the water or other fluid being treated can include additional, fewer and/or different treatment steps or processes of those shown in FIG. 1. For instance, a treatment system or scheme can combine sand and silt removal in a single step, which can be adapted to also remove one or more other materials (e.g., grit, oil, grease, larger items, etc.). In some embodiments, a primary settling tank can be used to help remove one or more of such items. The primary settling tank can include a continuous flow tank includes a pass-through rate that facilitates gravity settling of targeted items (e.g., sand, silt, grit, suspended solids, etc.). In some embodiments, a scum and/or oil removal device or system can be used to remove scum, oil and/or other materials or substances that tend to stay at or near the top of a particular water or other fluid being treated. For example, scum troughs or skimmers, separators and/or other devices, components and/or systems can be used. Further, the system 2 can include one or more inlet screens or similar devices or systems to remove larger items entering the system, as desired or required.

In some embodiments, the desander 12 is configured to remove most or all of suspended solids included in the water or other liquid being treated. The desander 12 can be configured to remove suspended solids that are 25 microns or μm (~0.001 inches) or greater. In other arrangements, the suspended solids and/or other materials that can be removed by a desander 12 can be greater or less than 25 microns, as desired or required.

According to some embodiments, the desander 12 comprises a hydrocyclone cone that uses centrifugal force. Such a cone can advantageously require little to no maintenance. In some arrangements, the desander requires 75 feet of head to permit the water or other liquid being treated to flow through it and be treated. In some embodiments, the inlet pressure of the water or other liquid entering the desander is 150 psi (e.g., 100 to 200, 120 to 180, 140 to 160, 100 to 140, 100 to 150, 120 to 140, 120 to 150, 120 to 160, 130 to 140, 130 to 150, 130 to 160, 130 to 170, 140 to 150, 140 to 160, 140 to 170, 140 to 180, 140 to 200 psi, values and ranges between the foregoing, etc.).

With continued reference to the treatment system/scheme 2 of FIG. 1, the water or other fluid being treated can be directed to a desilter 16. Although shown as separate systems or processes in the embodiment of FIG. 1, the treatment system 2 can include a single treatment system to help remove sand and silt (e.g., alone or together with other contaminants or substances). Alternatively, one, two or more different steps or processes can be used to remove various targeted contaminants and/or substances, as desired or required.

The desilter 16 can be configured to remove suspended solids that are 5 microns or μm (~0.0002 inches) or greater. In other arrangements, the suspended solids and/or other materials that can be removed by a desilter 16 can be greater or less than 5 microns, as desired or required. In some arrangements, the desilter requires 75 feet of head to permit the water or other liquid being treated to flow through it and be treated. In some embodiments, the inlet pressure of the water or other liquid entering the desilter is 150 psi (e.g., 100 to 200, 120 to 180, 140 to 160, 100 to 140, 100 to 150, 120 to 140, 120 to 150, 120 to 160, 130 to 140, 130 to 150, 130 to 160, 130 to 170, 140 to 150, 140 to 160, 140 to 170, 140 to 180, 140 to 200 psi, values and ranges between the foregoing, etc.).

Solids removed from any of the primary or preliminary steps (e.g., sand, silt, grit, oil, grease, larger items, etc.) can be landfilled, reused, reprocessed, recycled, recovered and/or as otherwise desired or required.

In some embodiments, as illustrated in the treatment system or scheme 2 of FIG. 1, a primary or preliminary treatment process can comprise deaerating or degassing 20. A deaerator or degasses 20 can be used to remove carbon dioxide, oxygen and/or other gases from water or other liquid being treated. Such gases can be permitted to escape freely into the surrounding environment. However, depending on the nature of the gas being stripped or otherwise removed from the water or other liquid being treated, additional treatment for such gases may be desired or required. For instance, in some embodiments, gases stripped or otherwise separated from a fluid source can include malodorous, combustible and/or other gases that need to be treated or neutralized (e.g., directed to a carbon scrubber, a combustion or burning device, etc.).

With continued reference to FIG. 1, the treatment system can further include one or more additional steps or processes (e.g., as part of primary or preliminary treatment). For example, the water or other liquid being treated can be directed to one or more lime softening tanks or similar treatment step 32 to remove hardness and/or additional unwanted substances and items from the water or other liquid being treated.

In some embodiments, lime or other precipitants that are formed or otherwise present in a softening tank 32 can coagulate and settle for removal. The softening tank 32 can be configured to remove lime, carbonates (e.g., calcium carbonate, magnesium carbonate, etc.) and/or other materials that contribute to water hardness, as desired or required. In some arrangements, aluminum sulfate, soda ash, hydrated lime and/or other chemicals that promote coagulation and/or settling can be added to the water or other liquid being treated during and/or prior to the water or liquid entering such a treatment device, system or step.

According to some embodiments, processing the water being treated through one or more softening tanks 32 can help alleviate the stress to the downstream reactor. For example, removing lime, hardness and/or other substances from the water at a location upstream of the reactor(s) can avoid overstressing the reactor(s). In some arrangements, if not removed in a prior step, such materials can also form insoluble materials within the reactor(s), thereby reducing the capacity, lowering operating efficiency and/or otherwise negatively impacting the operation of the reactor(s).

The reactions within the lime softening tank or similar treatment step 32 can be configured to occur such that a temperature of the water or other liquid being treated is at least 130° F. (e.g., at least 130, 135, 140, 145, 150° F., 130-140, 140-150, 130-150, 140-160° F., values or ranges between the foregoing, etc.). An elevated temperature (e.g., relative to the ambient temperature or temperature of the water of the fluid source) of the water or other liquid being treated can facilitate the chemical reactions, including coagulation and precipitation, that may occur within the lime softening process.

As illustrated in FIG. 1, in order to increase the temperature of the water or other liquid being treated prior to directing such water or other liquid into one or more lime softening tanks 32, the water or other liquid can be directed through and/or near one or more heat exchangers 24, 28, as desired or required. As discussed herein, such heat exchangers can take advantage of heat produced during the treatment processes (e.g., as a result of the reactions within the reactor 56) to advantageously reduce or eliminate the need for external energy supply to accomplish the necessary heating of the water or other liquid.

The lime, magnesium carbonates and/or other materials that precipitate as a result of softening can be permitted to settle out prior to removal. In some embodiments, such a waste stream can be used for inclusion in gypsum board, bricks and other items. Potassium chloride, other coagulants/precipitants that include potassium and/or the like can also be advantageously removed from the water or other liquid being treated using a softening step or process 32.

In some arrangements, the softening tanks 32 can include a tapered (e.g., conical) bottom portion to help capture the coagulants and other precipitants that have been formed and settled in the tanks 32. This sludge stream can be removed via gravity and/or pumping.

For any of the embodiments disclosed herein, including the treatment system and scheme 2 illustrated in FIG. 1, one or more flow control and/or other mechanical, electromechanical and/or other devices or components can be provided (e.g., even if not illustrated or discussed in the present application). Such devices or components can include, without limitation, pumps, pipes, channels, weirs, baffles and/or other hydraulic connectors or components, valves (e.g., check valves or backflow prevention valves), turbines (e.g., to advantageously generate energy by taking advantage of water or other liquid flowing through and/or past them), controllers and/or the like, as desired or required by a particular system design or configuration.

With continued reference to FIG. 1, the water or other liquid being treated can be configured to pass through one or more heat exchangers and/or other heat transfer devices, components or systems 24, 28, 40. As discussed in greater detail herein, such heat exchangers or similar devices can take advantage of the exothermic reactions occurring within the treatment system or scheme 2 to advantageously lower (e.g., lower, eliminate, etc.) the overall energy consumption requirements related to operation of the system/scheme.

However, in some embodiments, the systems and/or related treatment methods or schemes disclosed herein, or equivalents thereof, can be provided without the inclusion of heat exchangers or other heat transfer devices, components or systems. Therefore, the treatment systems and schemes can be powered using at least some externally supplied energy. Such energy can be electrical energy (e.g., as provided by a municipal power company), energy supplied by one or more green or clean technologies (e.g., solar power, wind, turbines, etc.), any other power source and/or the like.

In some embodiments, once the water or other liquid being treated has undergone a desired or required level of primary or preliminary treatment (e.g., to remove larger items, sand, silt, grit, other solids, lime, magnesium carbonates, substances that contribute to hardness, potassium chloride, other precipitants, gases and/or other contaminants, substances, materials and/or components), the water or other liquid can be directed to one or more second treatment steps or processes. For example, with reference to FIG. 1, the water can enter a reactor where the process of removing targeted salts or other dissolved solids can be initiated.

With reference to FIG. 1, before water or other liquid being treated enters one or more reactors 56 of the system 2, it can be directed to one or more mixing tanks 36 and/or other steps where the introduction of certain chemical additives can occur. In some embodiments, the pH of the water or other liquid being treated is increased to 10 or above (e.g., 9, 9.5, 10, 10.5, 11, 11.5, 12, 12.5, 13, 10 to 11, 11 to 12, 10 to 12, 12 to 13, 10 to 13, values between the foregoing values and ranges, above 13, etc.).

According to some embodiments, caustic soda (e.g., sodium hydroxide) and/or any other base is added to the water or other liquid being treated in order to increase the pH to a desired or require level. As discussed in greater detail below, other additives can also be introduced into the water or other liquid being treated upstream of the reactor(s) 56, such as, for example, soda ash, trisodium phosphate (TSP), aluminum sulfate and/or the like. One or more of these additional additives can also help increase the pH if they are basic in nature.

In some embodiments, the pH of the water or other liquid being treated is raised from between 5 and 8 (e.g., 5, 5.5, 6, 6.5, 7, 7.5, 8, 5 to 8, 5 to 7, 5 to 6, 6 to 8, 6 to 7, 7 to 8, pH values between the foregoing values and ranges, etc.) to 10 or more. In other embodiments, depending on the type of water or other liquid being treated, the starting pH can be less than 5 or greater than 8.

As noted above, one or more other chemicals or additives can be provided to the water or other liquid being treated within the mixing tanks 36. For instance, trisodium phosphate (TSP) can be added to the water to provide the necessary phosphate molecules within the reactor(s) to which targeted ions can bond and form new molecules/substances. In some embodiments, the molecules and/or other substances that are advantageously formed within the reactor(s) include, without limitation, sodium phosphate, calcium phosphate, magnesium phosphate, other molecules comprising sodium calcium, magnesium and/or the like. Therefore, the in some embodiments, the addition of TSP to the water or other liquid being treated can reduce hardness (e.g., as a result of molecules or other materials formed within the reactors).

The reactions within the mixing tanks 36 can be configured to occur such that a temperature of the water or other liquid being treated is at least 100° F. (e.g., at least 100, 105, 110, 115, 120, 125, 130, 135, 140, 145, 150, 155, 160° F., 100-160, 100-150, 100-140, 100-130, 100-120, 100-110, 110-160, 110-150, 110-140, 120-160, 130-160, 130-140, 140-150, 130-150, 140-160° F., values or ranges between the foregoing, etc.). In one embodiment, the temperature of the water or other liquid being treated is 150 to 170° F. (e.g., 150, 155, 160, 165, 170° F., etc.). The elevated temperature within the mixing tanks 36 can increase the reaction time of the various additives to the water or other liquid being treated, and thus, improve the overall treatment systems and methods.

In some embodiments, the amount of TSP and/or other additives is controlled according to one or more properties or characteristics of the water or other liquid being treated. One or more sensors and/or other detection devices or components can be strategically positioned or otherwise included at various locations throughout the treatment system 2 to detect certain chemical, physical or other parameters. For example, such sensors or other devices can detect the concentration of certain chemicals or components within the water or other liquid being treated (e.g., sodium, calcium, magnesium, other metal ions, chloride, other ions, substances that contribute to hardness and/or alkalinity, phosphates, etc.). Further, the sensors and/or other devices can be configured to detect one or more of the following: pH, temperature, pressure, flowrate, heat and/or the like.

According to some embodiments, information obtained from such sensors and/or other devices can be used to modify one or more aspects of the operation of the treatment system 2. Such control can be accomplished automatically, semi-automatically, manually, etc. For example, a pH sensor located upstream of the mixing tanks 36 can permit the system to add the proper amount of caustic soda (e.g., sodium hydroxide) to the water or other liquid being treated in order to adjust the pH of the water or other liquid to a desired or targeted level (e.g., 10 or 10.5). Likewise, a phosphate sensor located along a similar location can ensure that the proper amount of TSP and/or other phosphate-containing material is provided to the water in advance of the reactors. Therefore, the use of such sensors and other measuring device can help ensure that the intended reactions (e.g., chemical reactions, heat transfer reactions, etc.) of the system are occurring in accordance with a desired or required strategy.

In some arrangements, the system 2 comprises one or more processors that are configured to receive data and information from the various treatment steps, devices, systems and subsystems and other components of the system. Such processors can be programmed and otherwise adapted to make changes to the operation of one or more aspects of the system in view of the data and/or other information received. By way of example, such data and information can include those detected by the various sensors or other devices included within the system (e.g., temperature sensors, chemical concentration sensors, pressure sensors, pH sensors, level sensors, etc.).

According to some embodiments, the amount of TSP (and/or other phosphate-containing additive) that is provided to the water or other liquid being treated depends, at least in part, on the concentration of total dissolved solids (TDS) in the water or other liquid. In some embodiments, the overall amount of TDS of the water is used as the basis. However, in other alternatives, specific types of substances in the water that contribute to TDS (e.g., sodium, calcium, chloride, etc.) are used as the basis. Such a scheme can help ensure that the proper amount of phosphate and/or other chemical compound, component and/or material is provided to the water in advance of the reactors. The proper amount of such additives can depend, at least in part, on the expected chemical bonds, reactions and formations that will occur within the reactors, the impact of such additives on pH and/or other considerations.

In one embodiment, the amount of TSP and/or other additive can be matched (e.g., 1 to 1 ratio with respect to concentration) with the concentration of TDS of the water or other liquid being treated. However, in other embodiments, the relative amount of an additive can vary. Accordingly, such ratios can be less than 1:1 or greater than 1:1 of additive to TDS (e.g., 0.5:1, 0.75:1, 1:1, 1.25:1, 1.5:1, 2:1, etc.), as desired or required.

In some embodiments, the mixing tanks 36 are configured to completely mix any chemicals or other additives that are provided to the water or other liquid being treated within 30 seconds (e.g., within 30, 25, 20, 15, 10, 5 seconds, 0 to 30 seconds, 0 to 20 seconds, 0 to 10 seconds, times between the foregoing values or ranges, etc.).

According to some arrangements, the temperature of the water or other liquid being treated within the mixing tank(s) 36 is at least 100° F. (e.g., at least 100, 105, 110, 115, 120, 125, 130, 135, 140, 145, 150, 155, 160° F., 100-110, 100-120, 100-130, 100-140, 100-150, 110-120, 110-130, 110-140, 110-150, 130-140, 140-150, 130-150, 140-160° F., values or ranges between the foregoing, etc.).

In some embodiments, the temperature of the water or other liquid being treated within the mixing tank(s) 36 is at least 160° F. (e.g., at least 160, 165, 170, 175, 180, 185, 190, 195, 200, 205, 210, 220, 225, 230° F., values or ranges between the foregoing, greater than 230° F., etc.). An elevated temperature (e.g., relative to the ambient temperature or temperature of the water of the fluid source) of the water or other liquid being treated can facilitate the chemical reactions, including increasing the reaction time to a desired or required level.

According to some embodiments, the mixing tanks 36 comprise one or more mixing technologies, such as, for example, impellers, injector devices, other mixing components, devices or systems and/or the like. In some arrangements, the chemicals and/or other additives that are introduced into the water or other liquid being treated within and/or upstream of the mixing tanks 36 are configured to be combined with the water or other liquid (e.g., to form a uniform or generally or substantially a uniform solution) within a relatively short time period. In some embodiments, such a time period can be 1 minute or less (e.g., 60 seconds, 50 seconds, 40 seconds, 30 seconds, 20 seconds, 10 seconds, 5 seconds, 5 to 10 seconds, 0 to 10 seconds, 0 to 20 seconds, 10 to 20 seconds, 0 to 30 seconds, 0 to 60 seconds, values and ranges between the foregoing, etc.), as desired or required.

In some embodiments, the use of TSP as an additive within the mixing tank(s) 36 and prior to the reactor(s) 56 can provide one or more benefits and advantages. For instance, the phosphates in TSP can, due to their electrical charge (e.g., negative or ionic charge), help attract sodium or other positive ions (e.g., cations) once the water or other liquid being treated is directed into the one or more reactors 56 of the treatment system 2. As noted above, a higher pH can be achieved by the addition of chemical and/or other additives within the mixing tank(s) 36. Such a higher pH can be beneficial to the process, as it will translate to a higher concentration of hydrogen ions in the water or other liquid being treated. Such ions can assist with the reactions that occur within the reactor(s) 56, as discussed in greater detail herein.

With continued reference to the treatment system and scheme depicted in FIG. 1, the water or other fluid being treated exiting the one or more mixing tanks 36 can be directed into one or more reactors 56. As illustrated in FIG. 1, the water or other fluid being treated can be optionally directed to one or more heat exchangers or other heat transfer devices or systems 40 to advantageously adjust (e.g., increase) the temperature of the water or other liquid before such water or other liquid enters the one or more reactors 56. For example, as illustrated in FIG. 1, the water or other liquid that is being transferred to the one or more reactors 56 of the system 2 can be directed through a pre-heat exchanger 40 that is in fluid and thermal communication with the water or other fluid that is exiting the one or more reactors 56. Since the temperature of the water or other fluid being treated is increased as a result of the reactors and processes within the reactor(s) 56, the water or other fluid being treated will have an elevated temperature exiting the reactor(s) 56. For example, in some arrangements, the temperature of the water or other liquid exiting the reactor(s) 56 can be 450 to 600° F. At least a portion of this water or other liquid treated within the reactor(s) 56 can be directed into one or more heat exchangers and/or other heat transfer devices or systems to transfer heat to the water or other liquid entering the reactor(s) 56. Consequently, the temperature of the water or other liquid being directed into an inlet of the one or more reactor(s) 56 can increase. Simultaneously, the temperature of water or other liquid exiting the reactor(s) can decrease (e.g., as a result of the heat transfer).

According to some embodiments, the temperature of the water or other liquid entering the one or more reactors 56 of the treatment system 2 can be increased to over 350° F. (e.g., 350-360, 360-370, 370-380, 380-390, 390-400, 350-400, 355-365, 355-400, 350-380, 400-425, 425-450, 450-500° F., values and ranges between the foregoing values and ranges, greater than 500° F., etc.), as desired or required. In other embodiments, the temperature of the water or other liquid entering the one or more reactors 56 can be below 350° F. (e.g., 300-350, 300-310, 310-320, 320-330, 330-340, 340-350, 310-350, 310-340, 310-330, 320-350, 320-340, values and ranges between the foregoing, less than 300° F., etc.).

In some embodiments, the water or other liquid being treated should attain a temperature of at least 357° F. when in the reactor. The targeted chemical processes that occur within a reactor 56 can be accelerated or otherwise enhanced by even higher temperatures (e.g., 357-400, 357-360, 360-370, 370-380, 380-390, 390-400, 400-425, 425-450, 400-450, 450-500, 400-500, 500-550, 550-600, 500-600° F., temperatures between the foregoing values or ranges, temperatures above 600° F., etc.). In other arrangements, however, based on one or more other factors (e.g., pressure, pH, chemical additives added to the water or liquid in or upstream of the reactor, etc.), the desired temperature of the water or liquid being treated within a reactor 56 can be below 357° F. (e.g., 300-310, 300-320, 300-330, 300-340, 300-350, 300-355, 325-350, 350-355, 350-357, 250-300, 200-250, 200-300° F., temperatures between the foregoing values and ranges, temperatures below 200° F., etc.).

As discussed in greater detail below, such minimum temperatures of the water or other liquid (e.g., 357° F.) within the reactor can facilitate, together with one or more other factors (e.g., pressure, pH, flowrate, chemical additives added to the water or liquid in or upstream of the reactor, etc.), the chemistry of the salts targeted for removal and/or the chemistry of the water itself can be advantageously altered to achieve a desired result (e.g., removal of the salts and/or other substances from the water).

According to some embodiments, the elevated temperature of the water within the reactor 56 provides an opportunity to selectively and advantageously alter the chemistry of the liquid being treated, including the molecules contained therein. As noted above, given that the targeted temperatures for the water within the reactor 56 are above the boiling point of water, the pressure of water or liquid within the reactor 56 will need to be increased above atmospheric to maintain the water in its liquid state. By way of example, according to one embodiment, in order to maintain the water as a liquid within the reactor, when the water temperature is 350° F. to 500° F., the pressure of the water within the reactor is maintained between 400 to 500 psi or greater.

In some embodiments, the elevated temperature of the water in the reactor (e.g., temperature above 357° F.), the pressure of the water in the reactor (e.g., 400 to 500 psi), the pH of the water (e.g., 10, 10.5 or greater), the velocity of the water flowing through the reactor (e.g., 5 feet/sec or greater), the presence of certain chemical or additives in the reactor (e.g., phosphates) and/or one or more other factors can facilitate the formation of molecules that combine with targeted ions in the water, such as, for example, sodium, calcium, magnesium, etc. Such molecules that are formed within the one or more reactors 56 of the system 2 can maintain a stable form (e.g., insoluble) as they are directed to subsequent treatment steps (e.g., filtration, settling, polishing, etc.) where they can be removed from the water.

Accordingly, in some embodiments, the various systems and methods disclosed herein can be used to remove salts, hardness and/or other targeted substances without the use of reverse osmosis and/or other membrane technologies. However, in some arrangements, the various systems and methods disclosed herein can be supplemented using one or more membrane technologies (e.g., reverse osmosis, other membranes, etc.). In such configurations, the treatment process can still provide one or more benefits over existing technologies (e.g., a system that is more efficient and effective at treating briny water streams, reducing overall costs of constructing and/or operating a treatment system, providing a more environmentally-beneficial system that utilizes little to no external energy, etc.).

Figure 2:
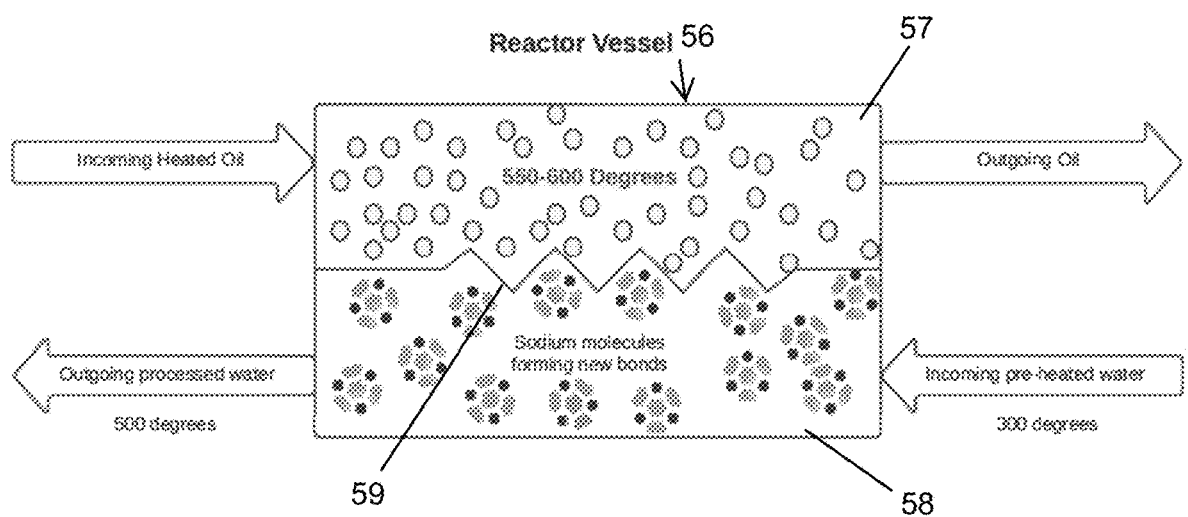
FIG. 2 schematically illustrates one embodiment of a reactor configured to be incorporated into a water or other fluid treatment system.

The reactor 56 can include a vessel or other tank that is enclosed to ensure that a desired pressure can be maintained for the water or other liquid passing therethrough. As illustrated schematically in FIG. 2, the reactor 56 can comprise a main chamber or portion 58 through which the water or other liquid being treated is configured to pass. Adjacent to and/or along one or more areas of the main chamber 58, a secondary chamber or portion 57 can be included. Such a secondary chamber or portion 57 can be configured to receive oil and/or another fluid intended to thermodynamically heat the water passing through the main chamber or portion 58 (e.g., via heat transfer). In some embodiments, the secondary chamber or portion is configured to circulate heated oil therethough. Possible oils that can be used include, but are not limited to, sunflower, avocado, olive, other plant-based or natural oils, synthetic oils, combinations of the foregoing and/or the like, as desired or required.

With reference to FIG. 1, the system 2 can comprise a supplemental heat generation system that can be used to transfer heat to the water or other liquid being treated within the reactor(s) 56. As discussed above in connection with FIG. 2, such a heat generation system can include the heating of oil. In some embodiments, such a supplemental heat generation system is used only during the start-up or other initial stages of a treatment system and method. For example, the as illustrated in FIG. 1, the heat generation system can include a boiler or other initial heat source 64, one or more pumps 60, filters 68, valves and/or other hydraulic components.

In some arrangements, an oil-based or other heat generation system can be configured to operate only during the initial time of operation (e.g., when the exothermic reactions resulting from the chemical reactions within the reactors 56 have not stabilized to produce the necessary heating to the water within and/or exiting the reactors. However, in some embodiments, once the operation of the system 2 has attained the necessary level of steady state, such a supplemental heating system may be unnecessary and may be terminated.

Regarding the mechanism by which salts and/or other substances contained within the water or liquid are removed, the elevated temperature to the water decreases the density, viscosity and surface tension of water. As a result, water molecules can at least partially dissociate and the mobility of anions and cations in the water or other liquid being treated can increase. Accordingly, water loses its ability to affect the dissociation of salts and/or other electrolytes present in the water. As a consequence of changes in the water chemistry at elevated temperatures, at least a fraction of the dissolved substances within the water (e.g., salts) can become and remain as undissolved or neutral chemical components. This can decrease the solubility of the salt compounds contained in the water solution.

The changes in water chemistry occurring at such elevated operating temperatures can also create energy in the form of heat. In other words, once these chemistry-related changes occur to the water being treated, resulting exothermic reactions will produce heat, which can be absorbed by the water to further increase the water temperature. In some embodiments, such exothermic reactions involve the formation of molecules of sodium (and/or other metal cations, e.g., magnesium, calcium, etc.) and phosphate (and/or other ions) within the reactors. As noted above, such increases in water temperature can further enhance the efficiency of the entire process.

One or more valves or other hydraulic components can be included in the system 2 to ensure that the temperature, pressure, flowrate and/or the physical or chemical characteristics of the water or other liquid being treated are maintained within desired or required levels or ranges. For instance, as illustrated in FIG. 1, exiting the reactor(s) can be configured to prevent the opening of one or more downstream valves 48 until the temperature, pressure thresholds and/or other requirements within the reactor(s) 56 have been attained. For example, if the water or other liquid being treated has not reached its target minimum temperature (e.g., 357° F., 400° F., etc.), the downstream valve or other flow control device 48 can be maintain in the closed position. Once the desired temperature, pressure and/or other properties have been attached, the valve 48 can be configured to open (e.g., automatically) to permit the water or other liquid to exit the reactor(s).

Likewise, as shown in FIG. 1, one or more valves or devices 44 can be included within one or more fluid pathways to regulate pressure and/or any other property, as desired or required. For example, the check valve 44 depicted in FIG. 1 can be used to prevent high pressure in the reactor 56 from releasing pressure into the heat exchange unit 40.

As illustrated in FIG. 1 and discussed herein, the treatment system 2 can advantageously include one or more heat exchangers or other heat transfer devices or systems/subsystems 24, 28, 40, as desired or required. As also discussed above, heat exchange can also occur within the reactor 56 in order to heat the water or other liquid to a desired level. Such heat exchangers can be strategically placed along various portions of the treatment system and scheme in order to transfer heat to the water or liquid being treated (e.g., in advance of certain treatment processes or steps).

For example, one or more heat exchangers 40 can be positioned and configured to transfer heat between the relatively hot water exiting the reactor(s) and the water that is entering the reactor(s). As a result, the temperature of the water entering the reactor(s) can be advantageously increased. As noted above, an increased temperature of the water or other liquid within a reactor can improve the chemical reactions desired to occur therein, can increase the efficiency of the process, can generate additional heat from the exothermic reactions occurring within the reactor(s) and/or provide one or more additional benefits or advantages.

With continued reference to FIG. 1, one or more heat exchangers 28 can be positioned and configured to transfer heat from the water exiting the reactor(s) 56 to relatively cooler water that is being directed to the softening tank(s) 32. Likewise, one or more heat exchangers 24 can be positioned and configured to transfer heat between the water exiting the softening tank(s) 32 to the water exiting the degasser or deaerator 20. As noted above, the lime softening and/or other reactions occurring within the softening tank(s) 32 can be enhanced if the water being treated therein has been heated to a particular level or range.

Under certain circumstances, once the reactor(s) have attained a particular operational threshold with respect to heat generation (e.g., via the exothermic chemical reactions occurring therein) and the temperature of the water or other liquid entering the reactor(s) has reached a particular level, the supplementary heating system (e.g., the oil heating system) can be terminated. In such arrangements, the heat generated within the reactor(s) can be used to sustain and handle all heating that is required throughout some or all of the treatment system. Accordingly, the need for external energy can be reduced or eliminated, reducing the system's carbon footprint and making the system environmentally friendly.

With continued reference to FIG. 1, water or other liquid exiting the reactor(s) 56 can be directed to one or more subsequent treatment processes or steps. As noted above, under certain desired or required conditions within a reactor (e.g., temperature, pressure, flowrate, pH, chemical concentrations, etc.), certain chemical reactions and formulations can occur. In some embodiments, such reactions comprise the formation of one or more insoluble materials comprising sodium, calcium magnesium, phosphate, chloride, other ions and/or other substances that are desired to be removed from the water or other liquid being treated. As discussed, such formed molecules and/or other insoluble substances can have the requisite stability to permit them to proceed to one or more of the downstream processes in a stable manner (e.g., without being dissolved, without being undermined or changed, etc.). Therefore, such molecules, compounds or other substances can be advantageously removed and separated from the water or other liquid being treated.

As illustrated in FIG. 1, the water or other liquid can be directed into one or more filters 80. In some embodiments, the filters 80 comprises multi-media filters, such as filters comprising sand and/or carbon. However, in other arrangements, any other type of filter can be used, including, without limitation, gravity filters, membrane filters and/or the like. In some embodiments, as noted above, the treatment system 2 does not incorporate any membrane filtration device, system, subsystem and/or components (e.g. reverse osmosis filtration, other filtration incorporating membranes, etc.). The filter can be a pressure system in which the water is directed into a pressurized vessel or other member. However, in other embodiments, the filter 80 can be non-pressurized (e.g., gravity-based), as desired or required.

The filters 80 can include sand and/or other media to remove any molecules, compounds and/or other substances present in the water or other liquid being treated. For example, the sand and/or any other media of the filter 80 can trap and/or otherwise capture any of the sodium, phosphate and/or other ion-based molecules that were formed within the reactor(s) 56. Further, additional substances and/or contaminants can be captured within the filter 80, regardless of whether or not they were formed in the reactors and/or any other process or treatment step of the system 2. In some embodiments, 65% to 95% (e.g., 65-95, 70-90, 70-80, 80-90%, percentages between the foregoing values and ranges, percentages greater than 95% or less than 65%, etc.) of the sodium and/or other salt containing compounds within the water or other liquid can be removed by the filter 80.

According to some embodiments, the sand and/or other media of the filter may need to undergo periodic backwashing to clear the sand and/or other media. Thus, the necessary backwash systems or components, including pumps, storage tanks, valves and the like, can be included in connection with the filters 80.

The filters 80 can also be configured to absorb, at least partially, hydrocarbons, odors, dyes, organic pollutants and/or the like. The filter 80 can include one or more types of carbon, depending on the type of water or liquid being treated, the contaminant levels of such water, the desired or required level of treatment and/or one or more considerations or factors. For example, the carbon included in a filter 80 can comprise activated carbon, granulated carbon, etc.

With continued reference to FIG. 1, water or other liquid exiting the filter(s) 80 can be directed to one or more settling tanks 84. In some embodiments, aluminum sulfate, lime and/or one or more other coagulants can be added to the water or other liquid. The addition of such chemicals can occur within and/or upstream of the settling tanks 84. In one embodiment, aluminum sulfate and lime are added to the water at a 3:1 ratio.

In some embodiments, the coagulants and/or other chemicals or substances added to the water will cause certain resulting coagulated substances to settle within the settling tank. Such coagulated substances can include, without limitation, compounds and molecules containing sodium, phosphate, arsenic, other metal ions, other ions and/or the like. In some embodiments, the aluminum sulfate that has been added to the settling tanks can attract certain molecules present in the water due, in part, to its electrical charge. In some embodiments, the pH and/or any other property of the water exiting the settling tanks 84 can be adjusted to desired or required levels (e.g., to meet regulatory requirements, to protect downstream components and distribution system and/or for any other purpose or reason).

The performance of the settling tanks 84 can be improved, under certain circumstance, by the addition of sand and/or other media to the tanks, by providing agitation or mixing to the tanks, by providing one or more screens, filters, weirs, baffles and/or the like to or in connection with the tanks and/or by making any additional improvements to the tanks, as desired or required.

In some embodiments, 0% to 10% (e.g., 0-10, 0-5, 5-10%, percentages between the foregoing values and ranges, percentages greater than 10%, etc.) of the sodium and/or other salt containing compounds within the water or other liquid can be removed by the settling tanks 84.

As depicted in FIG. 1, in some embodiments, water or other liquid being treated can be directed to one or more polishing tanks 88. The polishing tanks 88 can contain unique polishing beads (e.g., special molecular beads) that facilitate the removal of additional ions and/or other substances from the water or other liquid being treated. The polishing beads can comprise the size, electrical charge and/or any other characteristics or properties to help them attract sodium, chloride and/or other unwanted ions remaining in the water or other liquid. In some embodiments, the beads can be regenerated using water (e.g., warm water). However, in other embodiments, chemical regeneration and/or other treatment processes may be needed.

With continued reference to FIG. 1, one or more additional treatment steps and/or components can be included in a particular system 2 and corresponding treatment scheme. For example, the system can include disinfection (e.g., UV-based, chlorination or other chemical-based technology, etc.), additional filtration (e.g., reverse osmosis, other membrane filtration, etc.), a holding tank for storage and/or the like.

Figure 3:
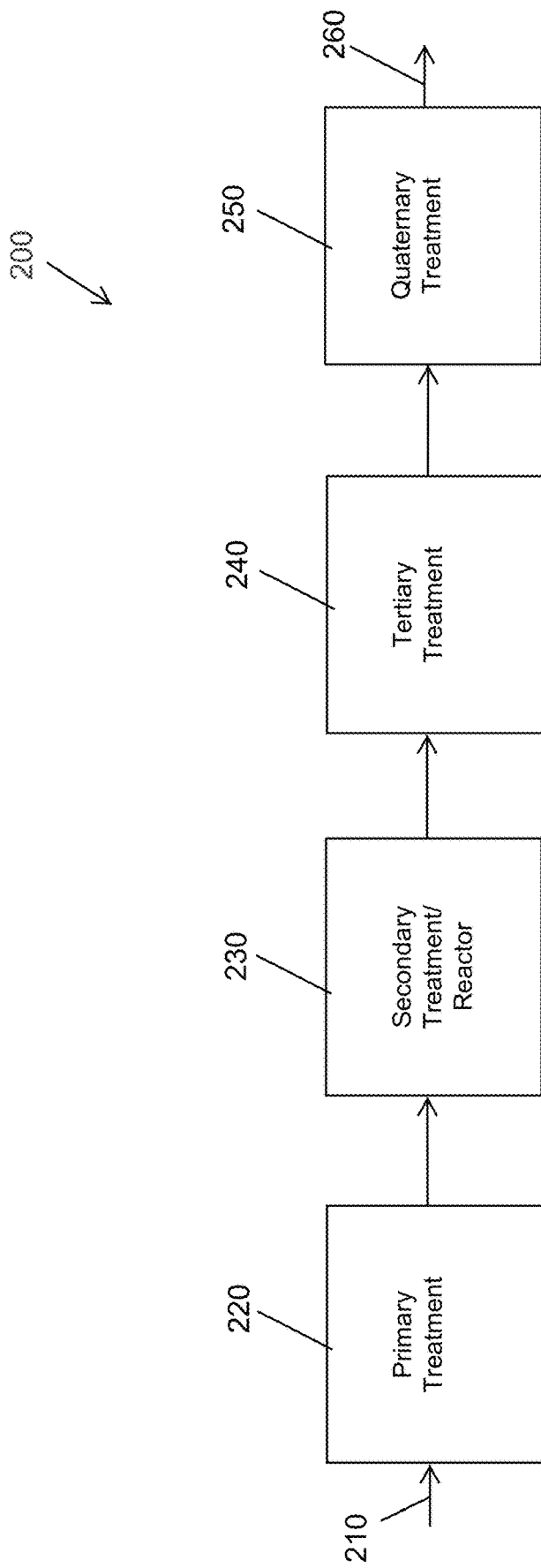
FIG. 3 schematically illustrates a process diagram of one embodiment of a water or other fluid treatment system.
Figure 4:
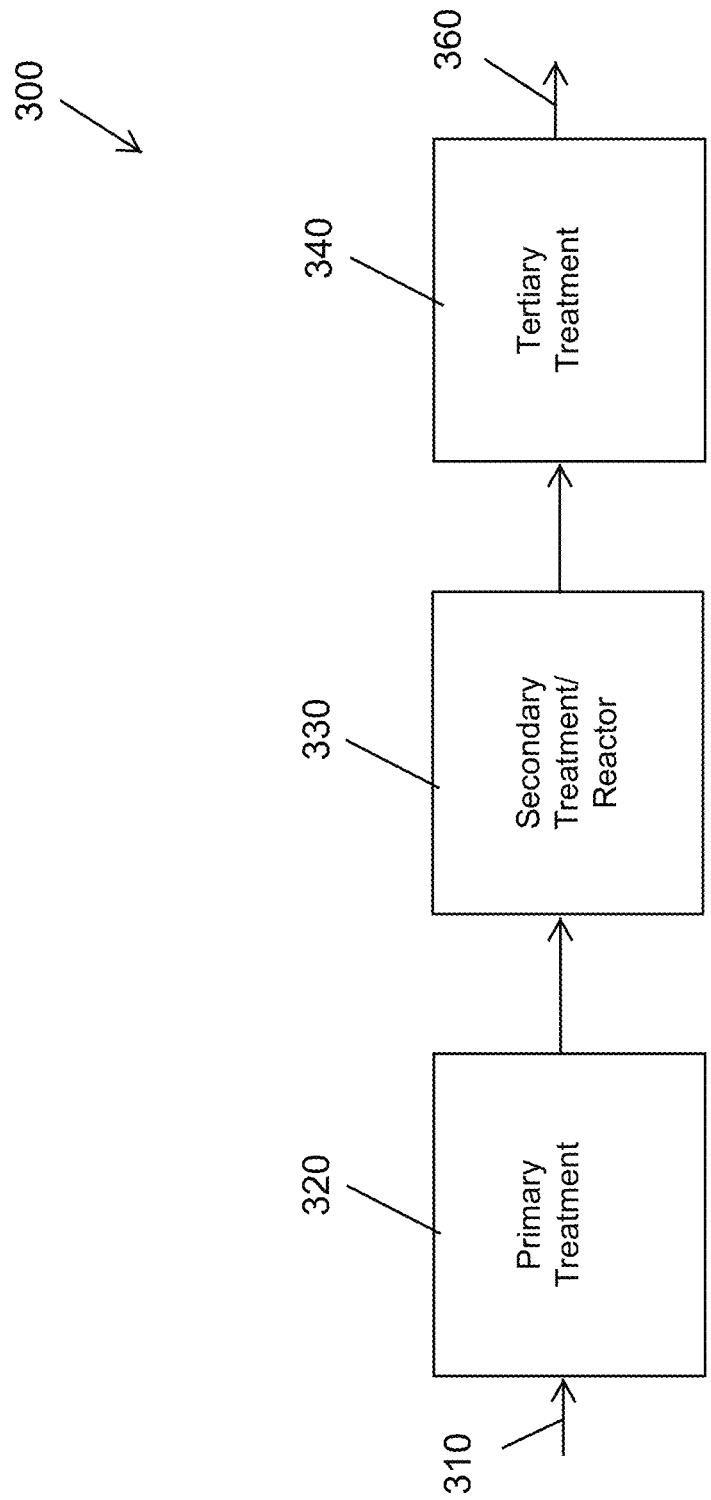
FIG. 4 schematically illustrates a process diagram of one embodiment of a water or other fluid treatment system.

FIGS. 3 and 4 schematically illustrate treatment systems or schemes 200, 300 more generally. For example, water or other liquid 210 entering the treatment system/scheme 200 illustrated in FIG. 3 can first be directed to one or more processes or steps of primary treatment 220. As discussed with reference to FIG. 1, primary treatment 220 can comprise one or more preliminary types of treatment, including without limitation, removal of sand, silt, grit, oil, grease, larger objects (e.g., using screens, settling tanks, etc.), removal and/or reduction of size of solids, degassing, lime softening, mixing, etc.).

With continued reference to FIG. 3, following primary treatment 220, the water or other liquid can be directed to one or more processes or steps related to secondary treatment 230 (e.g., treatment within one or more reactors 56 as discussed in connection with FIG. 1). During such processes or steps, sodium, chloride and/or other ions that are being targeted for removal can form certain insoluble molecules and compounds. Such molecules and compounds can be configured to be formed within one or more reactors under certain conditions (e.g., temperature, pressure, flowrate, pH, availability of chemical additives, etc.).

In some embodiments, following secondary treatment 230, the water or other liquid can be directed to one or more processes or steps associated with tertiary treatment 240. Tertiary treatment can include, without limitation, filtration, settling, polishing and/or other steps that help capture and remove the molecules and compounds formed, at least in part, during secondary treatment (e.g., in the reactors).

As illustrated in the schematic of FIG. 3, the treatment system or scheme 200 can further include additional treatment steps or processes, e.g., quaternary treatment 250. Such treatment can include, for example, additional filtration (e.g., membrane-based filtration), disinfection (e.g., UV, chlorination, etc.), storage and/or the like.

The schematic of FIG. 4 illustrates a treatment system or scheme 300 that is similar to the system or scheme of FIG. 3. However, as shown, the depicted system or scheme 300 only includes primary treatment 320, second treatment 330 and tertiary treatment 340. Accordingly, for any of the embodiments of a treatment system or scheme disclosed herein, the various treatment steps or processes can be modified (e.g., eliminated, replaced, added, etc.), in view of the particular water being treated, the level of desired or required treatment and/or one or more other considerations.

Figure 5:
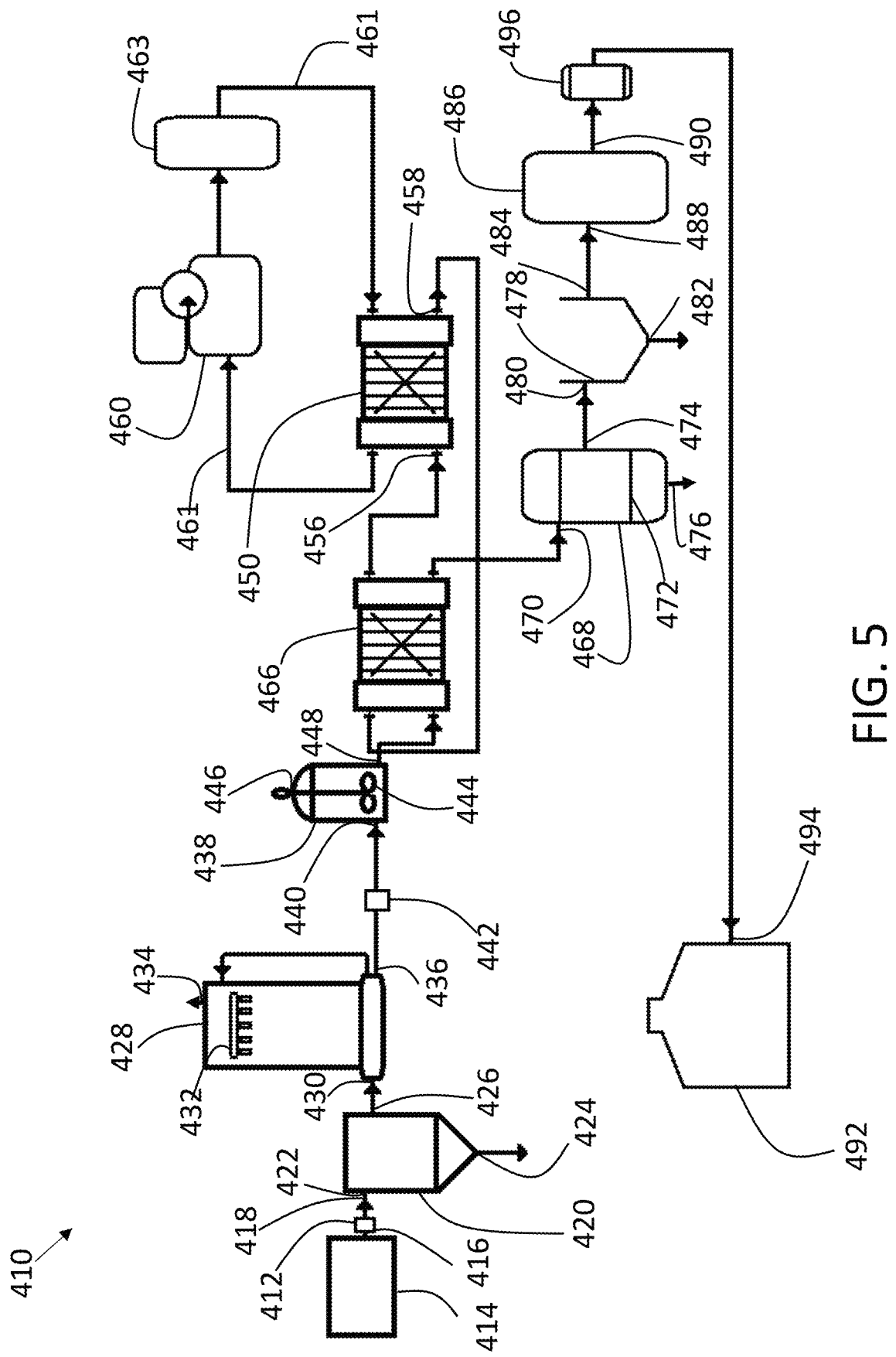
FIG. 5 schematically illustrates a process diagram of one embodiment of a water or other fluid treatment system.

Referring to FIG. 5, a system 410 for desalination utilizes a pump 412 to pump fluid to be desalinated from a fluid source 414. Fluid source 412 may be the ocean, flow back fluid from hydraulic fracking, or any other fluid source known by a person skilled in the art. Fluid to be desalinated is generally considered to be water, however it will be understood that other types of fluids may benefit from desalination and may be treated by system 410. In the embodiment shown, pump 412 is positioned at the front of system 410 with a pumping inlet 416 pulling fluid to be desalinated from fluid source 414 and directing it through pumping outlet 418 to system 410. It will be understood that the positioning of pump 412 may change depending upon the type of pump used. A person of skill will understand what types of pumps may be utilized in association with system 410. While the fluid to be desalinated may be pumped into system 410 at a variety of pressures, in one embodiment, the fluid to be desalinated enters system 410 at a pressure of 30 psi.

Fluid to be desalinated is pumped from fluid source 414 into a first filtering vessel 420 through first filtering fluid inlet 422 where suspended solids are removed from the fluid. First filtering vessel 420 may have a filter for filtering out solids or may be a settling tank in which the suspended solids settle out of the fluid solution. A first filtering drain 424 allows for the solids removed from the fluid to be desalinated to be removed from first filtering vessel 420 as they accumulate within first filtering vessel 420. After the removal of at least a portion of the suspended solids, the fluid to be desalinated passes through the first filtering fluid outlet 426 and into a degassing vessel 428 through a degassing fluid inlet 430 which is provided in fluid communication with first filtering fluid outlet 426. A baffle 432 for knocking gasses out of solution or other suitable mechanism for removing gasses from the fluid to be desalinated is provided within degassing vessel 428. A wide variety of degassing vessels 428 may be used and a person of skill in the art will understand what types of degassing vessels 428 are most appropriate. Degassing vessel 428 is used to remove at least a portion of the gasses from the fluid to be desalinated, in particular at least a portion of the carbon dioxide and oxygen in the fluid are removed. Degassing vessel 428 has a gas release 434 for allowing collected gas to be safely removed from degassing vessel 428. The fluid to be desalinated leaves degassing vessel 428 through degassing fluid outlet 436.

In the embodiment shown, a mixing tank 38 is provided for the purpose of mixing fluid treatment chemicals with the fluid to be desalinated following the removal of at least a portion of the suspended solids and gasses from the fluid. Mixing tank inlet 440 is provided in fluid communication with degassing fluid outlet 436. In the embodiment shown, a check valve 442 is provided between mixing tank inlet 440 and degassing fluid outlet 436 to prevent fluid from flowing backwards through system 410. A mixing mechanism 444, such as a mixing rotor as shown in the present embodiment, is used to mix fluid treatment chemicals that are added through chemical inlet 446 with the fluid to be desalinated within mixing tank 438. It will be understood by a person skilled in the art that other types of mixing mechanisms may be used, including but not limited to bubblers, vibrations of mixing tank 438 or any other suitable mixing mechanism. The types of fluid treatment chemicals used is dependent upon fluid source 412, however generally a phosphate and/or a dispersant is used. When fluid source 412 is salt water, it is common to treat the fluid to be desalinated with zinc and phosphinocarboxylic acid. When fluid source 412 is a flow back fluid from hydraulic fracking, an iron oxide dispersant such as Acumer 3100™ sold by Dow Chemicals and trisodium phosphate may be used. The pH of the fluid to be desalinated may also be adjusted to a pH value of approximately 10.5 through the use of sodium hydroxide. The fluid to be desalinated that has been treated with fluid treatment chemicals exits mixing tank 438 through a mixing tank outlet 448. Other fluid treatment chemicals such as lime and soda ash may also be used. Use of a 50/50 mixture of lime and soda ash can assist in sedimentation of particles. Phosphates and acumer may be beneficial in maintaining sodium particles in suspension and increasing the mass and weight of the sodium particles. It will be understood that while mixing tank 438 improves the mixing of fluid treatment chemicals with fluid to be desalinated, it is possible to add fluid treatment chemicals without the use of mixing tank 438 such as by injecting directly into the flow of fluid to be desalinated.

Figure 6:
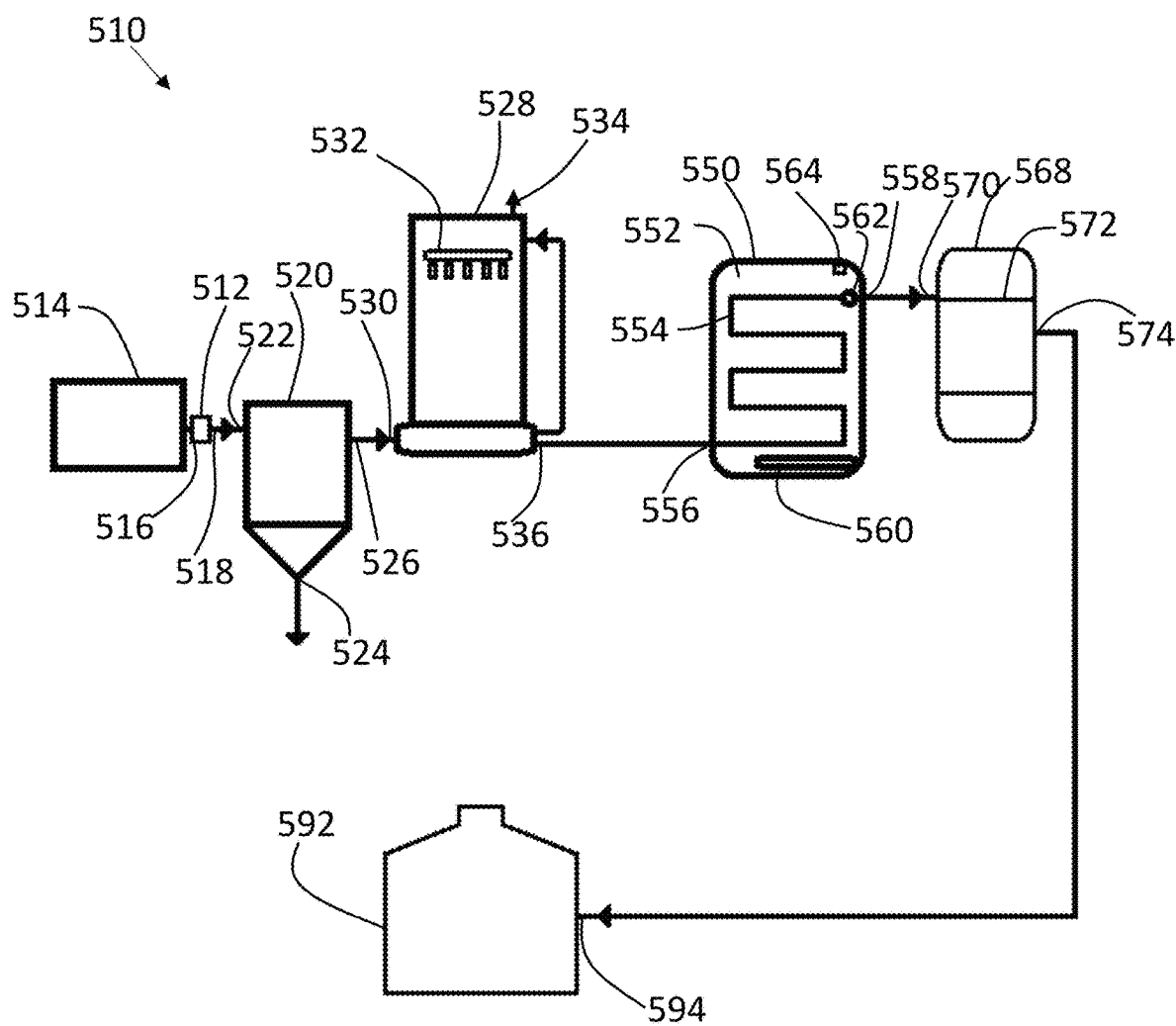
FIG. 6 schematically illustrates a process diagram of one embodiment of a water or other fluid treatment system.
Figure 7:
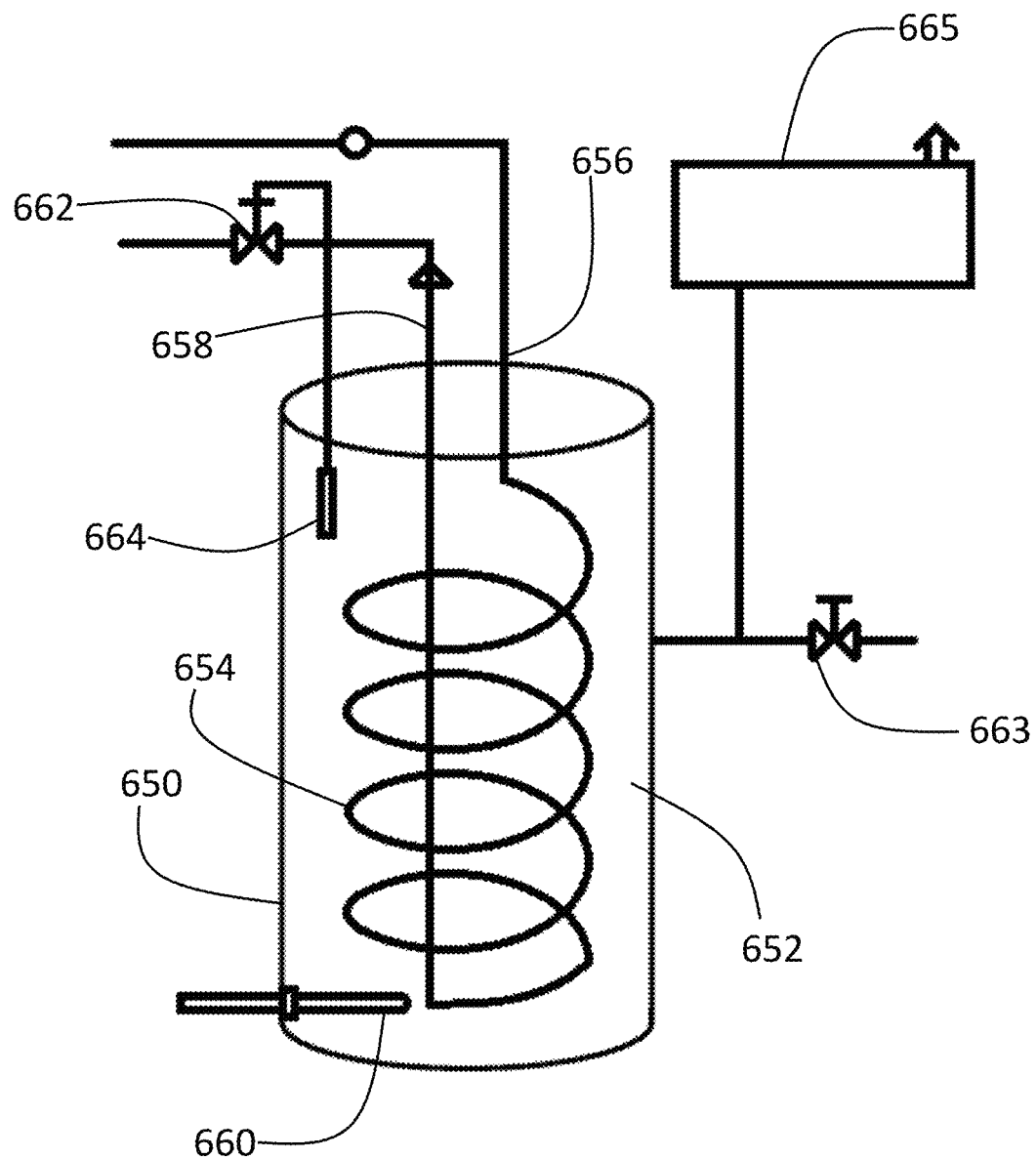
FIG. 7 illustrates a side elevation view, in section, of a heating vessel according to one embodiment.

Fluid to be desalinated travels from mixing tank 438, or degassing vessel 428 when mixing tank 438 is not used, to heating vessel 450. Referring to FIGS. 6 and 7, heating vessel 550, 650 has a hollow interior 552, 652 and a transfer tube 554, 654. Transfer tube 554, 654 has a heating vessel inlet 556, 656 that is provided in fluid communication with mixing tank outlet 648, or degassing fluid outlet 536, 636 when mixing tank 538, 638 is not used. In the embodiment shown, transfer tube 554, 654 traverses hollow interior 552, 652 five times before allowing fluid to be desalinated to exit through heating vessel outlet 558, 658, however it will be understood by a person skilled in the art that transfer tube 554, 654 may traverse hollow interior 552, 652 a different number of times depending upon the size of heating vessel, hollow interior 552, 652 and transfer tube 554, 654. Transfer tube 554, 654 should be long enough that it allows time for the reactions between fluid treatment chemicals and fluid to be desalinated to begin. A person of skill will understand that different reaction times will be seen depending upon a number of different factors, including the type of fluid to be desalinated, the types of fluid treatment chemicals, the temperature of heating vessel and the pressure of heating vessel. Transfer tube 554, 654 is preferably made of an alloy metal that does not allow the salt in the fluid to be desalinated to stick to it. Hollow interior 552, 652 has a first fluid that is heated by a heater 560, 660. A first fluid fill valve 663 may be provided for filling hollow interior 552, 652 with first fluid. A balancing tank 665 may also be provided for assisting in maintaining a proper amount of first fluid within hollow interior 552, 652. Heater 560, 660 may be positioned within hollow interior 552, 652 of heating vessel 550, 650 or may heat first fluid from the exterior of heating vessel 550, 650. In the embodiment shown in FIG. 5, heater 460 is a boiler. A flow loop 461 is used to transfer first fluid from heating vessel 450 to boiler and back to heating vessel 450. A filter 463 positioned downstream of boiler acts to filter first fluid before it circulates back to heating vessel 450. In the embodiment shown in FIGS. 6 and 7, heater 560, 660 is an electric heater submerged within first fluid of heating vessel 550, 650. It will be understood by a person skilled in the art that other suitable heaters known in the art. First fluid may be an oil such as mineral oil, sunflower oil, vegetable oil, olive oil or any other suitable oil known to a person skilled in the art. Heater 560, 660 heats first fluid to a temperature of 450° F. and this heat is transferred to fluid to be desalinated that flows through transfer tube 554, 654. Generally, the reactions of fluid treatment chemicals and fluid to be desalinated begins at a temperature of about 425° F. A one-way valve 562, 662 is positioned in heating vessel outlet 558, 658 and opens when the temperature of the fluid to be desalinated reaches a predetermined temperature. A sensor 564, 664 such as a temperature sensing bulb sends signals to one-way valve 562, 662 when the predetermined temperature has been reached. In an embodiment, the temperature at which one-way valve 562, 662 opens is 450° F. Sensor 564, 664 may be positioned within transfer tube 554, 654 or be positioned within hollow interior 552, 652 near one-way valve 562, 662. To maintain the fluid to be desalinated as a liquid, the pressure of heating vessel is kept at approximately 550 psi. As chemical reactions occur, the salt molecules will disassociate from the fluid but remain in suspension due to the addition of the fluid treatment chemicals and pH adjustment. The mass and weight of the salt molecules increases substantially as a result of the reactions. The fluid to be desalinated exits through one-way valve 562, 662 and heating vessel outlet 658 at a temperature of approximately 450° F.

Heating vessel 450 may be provided in fluid communication with a heat exchanger 466 that cools fluid to be desalinated to a temperature of about 110° F. after it has passed through heating vessel 450. Heat exchanger 466 may be used to pre-heat fluid to be desalinated prior to it flowing into heating vessel 450. Fluid to be desalinated that has not been heated to approximately 450° F. is passed through heat exchanger 466 and interacts with fluid to be desalinated that has been heated to approximately 450° F. In this way, fluid entering heating vessel 450 for the first time is preheated. Pre-heating the fluid to be desalinated prior to entering heating vessel 450 using fluid to be desalinated that has already been heated and needs to be cooled can increase the efficiency of system 410. Heat exchanger 466 may be a conventional plate and frame heat exchanger or any other type of exchanger know to a person skilled in the art.

As fluid to be desalinated is cooled, molecules are removed from solution and become suspended in fluid to be desalinated. Fluid to be desalinated enters a second filtering vessel 468 through a second filtering inlet 470. Where heat exchanger 466 is not used, second filtering inlet 470 is provided in fluid communication with heating vessel outlet 58. When heat exchanger 466 is used, second filtering inlet 470 is provided in fluid communication with heat exchanger 466. Second filtering vessel 468 has at least one filter 472 which is used to filter out molecules larger than 3 microns, including salt and Acumer 3100™ molecules. Once the fluid has passed through filter 472, it exits second filtering vessel 468 through second filtering outlet 474. Molecules filtered out by filter may be collected through second drain 476.

In the embodiment shown, a settling tank 478 is provided. Settling tank inlet 480 is provided in fluid communication with second filtering outlet 474. Fluid in settling tank 478 may be treated with lime and aluminum sulfate to precipitate out any phosphate molecules still in solution. A 3:1 ratio of alum to aluminum sulfate may be used, however other ratios or other chemicals may also be used to precipitate out molecules. The precipitated molecules may be collected through settling tank drain 482 where they can be dried and reused. After settling, the fluid exits settling tank 480 through settling tank outlet 484.

In the embodiment shown, a polishing vessel 486 is provided. Polishing vessel inlet 488 is provided in fluid communication with settling tank outlet 484. Polishing vessel 486 contains a plurality of resin beads which filter out fine molecules such as sodium molecules. After polishing, fluid travels through polishing vessel outlet 490 to a holding tank 492 where the now desalinated fluid is held. Fluid flows into holding tank 492 through a desalinated fluid inlet 494 which is provided in communication with polishing vessel outlet 490. Where polishing vessel 486 is not used, desalinated fluid inlet 494 will be in communication with settling tank outlet 484 or second filtering outlet 474 depending upon which vessels are being utilized in system 410.

The desalinated fluid may be treated with UV to kill bacteria. This may occur within holding tank 492, any of the vessels of system 410 or a separate UV treatment tank 496 may be used. UV treatment tank 496 is generally positioned in front of holding tank 492, however it will be understood that UV treatment can occur anywhere within system 410.

In addition to desalinating a fluid, system 410 may also be used to remove arsenic and other potential harmful chemicals and materials as many of these are removed at the same time as the sodium chloride due to the chemical processes between the fluid to be desalinated and the treatment chemicals.

While the inventions are susceptible to various modifications, and alternative forms, specific examples thereof have been shown in the drawings and are herein described in detail. It should be understood, however, that the inventions are not to be limited to the particular forms or methods disclosed, but, to the contrary, the inventions are to cover all modifications, equivalents, and alternatives falling within the spirit and scope of the various embodiments described and the appended claims. Any methods disclosed herein need not be performed in the order recited. The methods summarized above and set forth in further detail below describe certain actions taken by a practitioner; however, it should be understood that they can also include the instruction of those actions by another party. The methods summarized above and set forth in further detail below describe certain actions taken by a user (e.g., a professional in some instances); however, it should be understood that they can also include the instruction of those actions by another party. The ranges disclosed herein also encompass any and all overlap, sub-ranges, and combinations thereof. Language such as "up to," "at least," "greater than," "less than," "between," and the like includes the number recited. Numbers proceeded by a term such as "about" or "approximately" include the recited numbers. For example, "about 10 mm" includes "10 mm." Terms or phrases preceded by a term such as "substantially" include the recited term or phrase. For example, "substantially parallel" includes "parallel."

What is claimed is:

1. A method for desalination of a liquid, the liquid having dissolved salt, the method comprising:
    treating the liquid using at least one primary treatment process;
    treating the liquid using at least one secondary treatment process, wherein treating the liquid using the at least one secondary treatment process comprises passing the liquid through at least one reactor; and
    treating the liquid using at least one tertiary treatment process;
    wherein treating the liquid using the at least one primary treatment process comprises adding at least one chemical additive to the liquid and adjusting a pH of the liquid to a minimum target pH level;
    wherein treating the liquid using the at least one secondary treatment process comprises heating the liquid to a temperature of at least 350° F. and supplying a pressure to the liquid to maintain the liquid in a liquid state within the at least one reactor;
    wherein treating the liquid using the at least one secondary treatment process comprises reacting dissolved salt of the liquid with at least a portion of the at least one chemical additive to form an insoluble product within the at least one reactor;
    wherein heat is produced when the insoluble product is formed within that at least one reactor; and
    wherein treating the liquid using the at least one tertiary treatment process comprises removing at least a portion of the insoluble product formed within the at least one reactor from the liquid.
2. The method of claim 1,
    wherein the minimum target pH level is 10;

wherein the at least one chemical additive comprises a phosphate salt; and wherein the insoluble product comprises a cation of dissolved salt and phosphate.

3. The method of claim 1, wherein the minimum target pH level is 10.

4. The method of claim 1, wherein the at least one chemical additive comprises a phosphate salt.

5. A method for desalination of a liquid, the liquid having dissolved salt, the method comprising:

performing primary treatment on the liquid;

performing secondary treatment on the liquid following primary treatment, wherein performing secondary treatment comprises delivering the liquid to at least one reactor; and performing tertiary treatment on the liquid following secondary treatment;

wherein primary treatment comprises adding at least one chemical additive to the liquid and adjusting a pH of the liquid to a minimum target pH level;

wherein secondary treatment comprises heating the liquid to a temperature of at least 350° F. and to supplying a pressure to the liquid to maintain the liquid in a liquid state within the at least one reactor;

wherein secondary treatment comprises reacting dissolved salt of the liquid with at least a portion of the at least one chemical additive to form an insoluble product within the at least one reactor for subsequent removal from the liquid.

6. The method of claim 5, wherein the minimum target pH level is 10;

wherein the at least one chemical additive comprises a phosphate salt; and wherein the insoluble product comprises a cation of dissolved salt and phosphate.

7. The method of claim 5, wherein the minimum target pH level is 10.

8. The method of claim 5, wherein the at least one chemical additive comprises a phosphate salt.

9. The method of claim 8, wherein the phosphate salt comprises trisodium phosphate.

10. The method of claim 5, wherein the at least one chemical additive comprises a dispersant.

11. The method of claim 10, wherein the dispersant comprises an iron oxide dispersant.

12. The method of claim 5, wherein performing primary treatment comprises removing at least one of the following from the liquid: sand, silt, suspended solids and gases.

13. The method of claim 5, wherein performing tertiary treatment comprises polishing the liquid in a vessel having resin beads.

14. The method of claim 5, wherein performing tertiary treatment comprises disinfecting the liquid.

* * * * *